United States Patent
Morikawa et al.

[11] Patent Number: 6,161,171
[45] Date of Patent: Dec. 12, 2000

[54] APPARATUS FOR PIPELINING SEQUENTIAL INSTRUCTIONS IN SYNCHRONISM WITH AN OPERATION CLOCK

[75] Inventors: Toru Morikawa; Nobuo Higaki; Shinji Ozaki; Keisuke Kaneko; Satoshi Ogura; Masato Suzuki, all of Osaka, Japan

[73] Assignee: Matsushita Electric Industrial Co., Ltd., Osaka, Japan

[21] Appl. No.: 09/105,212

[22] Filed: Jun. 26, 1998

[30] Foreign Application Priority Data

Jun. 27, 1997 [JP] Japan .................................. 9-171400

[51] Int. Cl.[7] .................................................. G06F 13/00
[52] U.S. Cl. .............................. 712/42; 712/41; 713/501
[58] Field of Search ...................... 711/140, 169, 711/167, 117; 713/501; 712/216, 214, 215, 203, 43, 229, 226, 23, 41, 42; 327/298

[56] References Cited

U.S. PATENT DOCUMENTS

| | | | |
|---|---|---|---|
| 5,313,621 | 5/1994 | Chan | 710/48 |
| 5,590,368 | 12/1996 | Heeb et al. | 712/216 |
| 5,625,806 | 4/1997 | Kromer | 713/501 |
| 5,768,560 | 6/1998 | Lieberman et al. | 711/167 |
| 5,778,208 | 7/1998 | Eickemeyer et al. | 712/203 |
| 5,787,488 | 7/1998 | Garde | 711/169 |
| 5,802,360 | 9/1998 | Fernando | 712/229 |
| 5,815,693 | 9/1998 | McDermott et al. | 713/501 |
| 5,926,053 | 7/1999 | McDermott et al. | 327/298 |

FOREIGN PATENT DOCUMENTS

01065635  10/1989  Japan .

Primary Examiner—Thomas C. Lee
Assistant Examiner—Walter Benson
Attorney, Agent, or Firm—McDermott, Will & Emery

[57] ABSTRACT

A first instruction requiring that a data word should be read out from a data memory and be stored in a certain register in a register set, and then a second instruction requiring that two operands, respectively read out from the register and another register in the register set, should be added are pipeline-processed. In a high-speed mode in which an operation clock having a higher frequency is supplied, a data cache intervened between an instruction execution circuit and the data memory is controlled to supply a data word to a WB (write back) stage of the instruction execution circuit within two cycles with respect to an input address associated with the first instruction. In order to execute the second instruction, the data word is supplied from the WB stage to an EX (operation execution) stage of the instruction execution circuit. In a low-speed mode in which an operation clock having a lower frequency is supplied, the data cache is controlled to supply a data word to an MEM (memory access) stage of the instruction execution circuit within one cycle with respect to an input address associated with the first instruction. In order to execute the second instruction, the data word is bypassed from the MEM stage to the EX stage.

6 Claims, 6 Drawing Sheets

APPARATUS FOR PIPELINING SEQUENTIAL INSTRUCTIONS IN SYNCHRONISM WITH AN OPERATION CLOCK

BACKGROUND OF THE INVENTION

The present invention relates to a microcomputer including a plurality of pipeline stages for executing a plurality of sequentially given instructions in synchronism with an operation clock.

A microcomputer, provided with a plurality of pipeline stages, including an instruction fetch stage (IF stage), an instruction decoding stage (DEC stage) and an instruction execution stage, is well known. The central processing unit (CPU) of such a microcomputer includes: an instruction fetch circuit for fetching an instruction; an instruction decoding circuit for decoding the fetched instruction; an instruction execution circuit for executing the decoded instruction; and a pipeline control circuit for controlling the pipeline processing performed by the instruction fetch circuit, the instruction decoding circuit and the instruction execution circuit. The instruction execution circuit is provided with a plurality of stages including, for example: an operation execution stage (EX stage) for performing operand address operations and/or operations on the operands read out from a resister set; a memory access stage (MEM stage) for accessing a data memory; and a write back stage (WB stage) for writing data words representing the operation results and/or the data words provided from the data memory into the register set. The MEM stage is sometimes subdivided into a plurality of sub-stages (e.g., MEM1 and MEM2 stages).

A data cache is often intervened between the instruction execution circuit and the data memory. If a clock rate is high, not only the CPU but also the data cache should have a pipeline structure. However, it is the user of a microcomputer that determines the frequency of the operation clock to be supplied to the microcomputer. Thus, even a microcomputer having such a configuration as ensuring high performance at a high clock rate would not always guarantee high performance at a low clock rate so long as the configuration lacks in flexibility.

SUMMARY OF THE INVENTION

The object of the present invention is to always guarantee high performance to a microcomputer including a data cache irrespective of whether or not a clock rate is changed.

In order to accomplish this object, the microcomputer of the present invention executes a plurality of sequentially given instructions in synchronism with an operation clock by providing: a plurality of pipeline stages including a first particular stage, a second particular stage located posterior to the first particular stage and a third particular stage located posterior to the second particular stage; means for specifying one of a high-speed mode, in which a clock having a higher frequency than a predetermined frequency is supplied to the microcomputer as the operation clock, and a low-speed mode, in which a clock having a lower frequency than the predetermined frequency is supplied to the microcomputer as the operation clock; a data cache for supplying a data word to the second particular stage within a first number of cycles of the operation clock where the low-speed mode has to been specified, and for supplying a data word to the third particular stage within a second number of cycles of the operation clock where the high-speed mode has been specified, in response to an input address associated with a certain instruction, the second number being larger than the first number; and means for supplying the data word, which has been supplied from the data cache to the second particular stage, to the first particular stage where the low-speed mode has been specified, and for supplying the data word, which has been supplied from the data cache to the third particular stage, to the first particular stage where the high-speed mode has been specified, in order to execute a succeeding instruction.

According to the present invention, if a clock rate is changed, then the operation modes of the data cache are switched. And, in accordance with the switch of the operation modes of the data cache, the bypassing routes to the first particular stage are also changed. The bypassing route assigned to the high-speed mode is not changed as long as the high-speed mode is specified and the bypassing route assigned to the low-speed mode is not changed as long as the low-speed mode is specified.

DETAILED DESCRIPTION OF THE INVENTION

Figure 1:
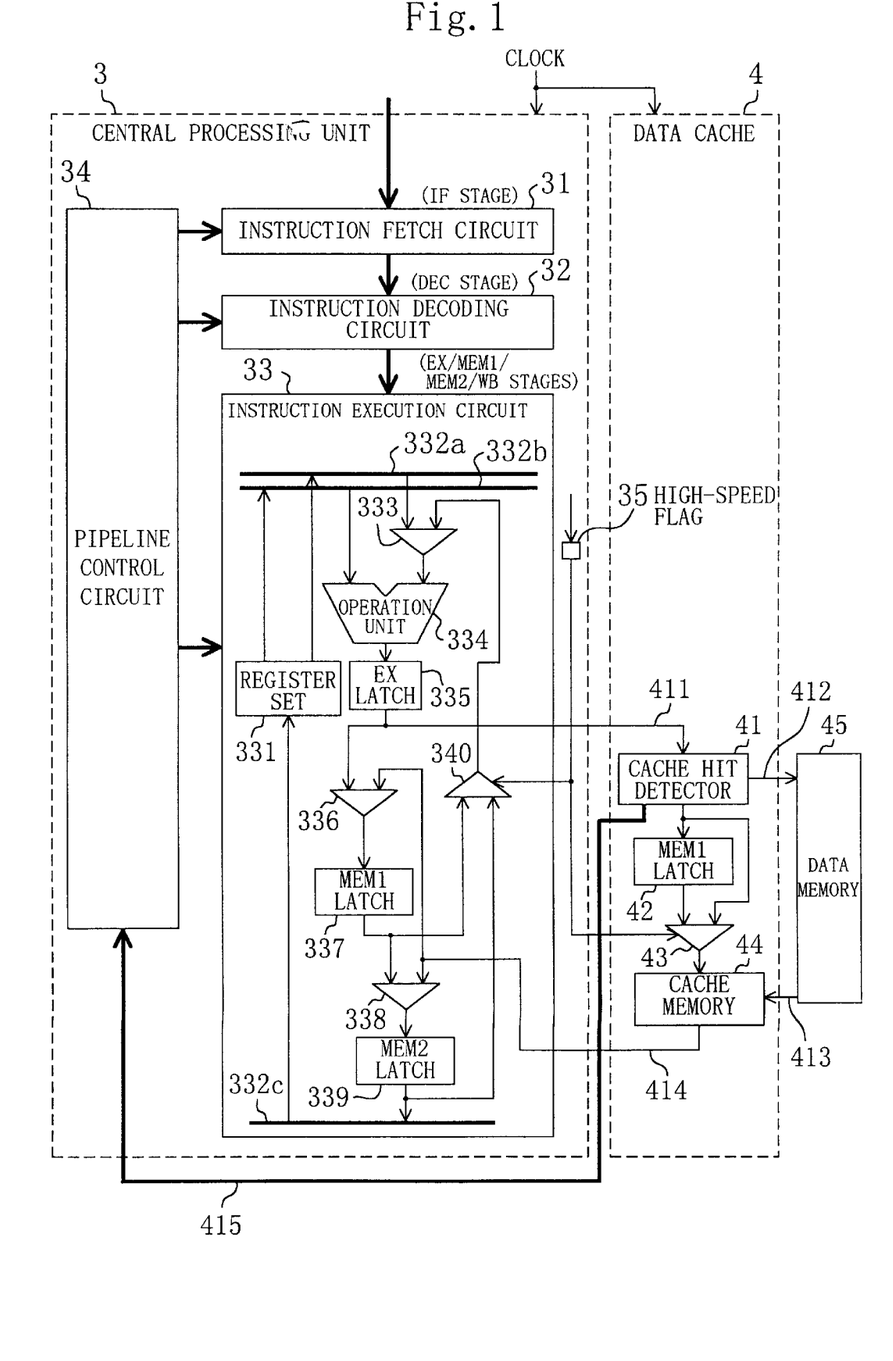
FIG. 1 is a block diagram illustrating an exemplary configuration of the microcomputer according to the present invention.

FIG. 1 illustrates an exemplary configuration of the microcomputer of the present invention. In FIG. 1, a central processing unit (CPU) 3 and a data cache 4 which constitute a core of the microcomputer, and a data memory 45 as an external memory are illustrated. An operation clock having a frequency determined by the user of this microcomputer is supplied to the CPU 3 and to the data cache 4.

The CPU 3 includes: an instruction fetch circuit (IF stage) 31 for fetching an instruction from an instruction memory (not shown); an instruction decoding circuit (DEC stage) 32 for decoding the fetched instruction; an instruction execution circuit (EX/MEM1/MEM2/WB stages) 33 for executing the decoded instruction; a pipeline control circuit 34 for controlling the pipeline processing performed by the instruction fetch circuit 31, the instruction decoding circuit 32 and the instruction execution circuit 33; and a high-speed flag 35 for specifying a high-speed mode in which a clock having a frequency higher than 50 MHz is supplied as the operation clock or a low-speed mode in which a clock having a frequency equal to or lower than 50 MHz is supplied as the operation clock. The value of the high-speed flag 35 is set by the user at "1" for the high-speed mode and at "0" for the low-speed mode.

The instruction execution circuit 33 includes: a register set 331; A, B and C buses 332a, 332b and 332c; a first selector 333; an operation unit 334; an EX latch 335; a second selector 336; an MEM1 latch 337; a third selector 338; an MEM2 latch 339; and a fourth selector 340. The register set 331 includes at least an A0 register, a D0 register and a D1 register. The A0 register stores an address. The D0 and D1 registers both store data words. The register set 331 transmits an address/data word to the A bus 332a or the B bus 332b or receives and stores an address/data word supplied from the C bus 332c. The first selector 333 selects either one of the two inputs, i.e., the address/data word supplied from the A bus 332a and the output of the fourth selector 340. The operation unit 334 performs various operations by using at least one of the operands (addresses/data words) supplied from the B bus 332b and the output of the first selector 333. The EX latch 335 is a pipeline latch for latching the output of the operation unit 334 in synchronism with the operation clock. The second selector 336 selects either one of the two inputs, i.e., the output of the EX latch 335 and the output of the data cache 4. The MEM1 latch 337 is a pipeline latch for latching the output of the second selector 336 in synchronism with the operation clock. The third selector 338 selects either one of the two inputs, i.e., the output of the MEM1 latch 337 and the output of the data cache 4. The MEM2 latch 339 is a pipeline latch for latching the output of the third selector 338 in synchronism with the operation clock. The address/data word latched in the MEM2 latch 339 is supplied to the input of the fourth selector 340 and to the C bus 332c. If the high-speed flag 35 is "0" (indicating the "low-speed mode"), then the fourth selector 340 selects the first input, i.e., the output of the MEM1 latch 337. Alternatively, if the high-speed flag 35 is "1" (indicating the "high-speed mode"), then the fourth selector 340 selects the second input, i.e., the output of the MEM2 latch 339. The reference numeral 411 denotes an address bus for transferring an address latched in the EX latch 335 to the data cache 4. The reference numeral 414 denotes a data bus for supplying a data word from the data cache 4 to the respective inputs of the second selector 336 and the third selector 338.

The data cache 4 includes: a cache hit detector 41; an MEM1 latch 42; an address selector 43; and a cache memory 44. The cache hit detector 41 includes a tag memory and determines whether an address supplied through the address bus 411 causes a cache hit or a cache miss to occur. The cache-hit causing address is supplied to the respective inputs of the MEM1 latch 42 and the address selector 43. The MEM1 latch 42 is a pipeline latch (or address latch) for latching an input address supplied from the cache hit detector 41 in synchronism with the operation clock. If the high-speed flag 35 is "0" (indicating the "low-speed mode"), then the address selector 43 selects the first input, i.e., the address supplied from the cache hit detector 41. Alternatively, if the high-speed flag 35 is "1" (indicating the "high-speed mode"), then the address selector 43 selects the second input, i.e., the output of the MEM1 latch 42. The cache memory 44 supplies a requested data word to the data bus 414 in accordance with the output of the address selector 43. In the low-speed mode, the data word supplied from the cache memory 44 is selected by the second selector 336 and latched in the MEM1 latch 337. Alternatively, in the high-speed mode, the data word supplied from the cache memory 44 is selected by the third selector 338 and latched in the MEM2 latch 339.

When the cache hit detector 41 determines a cache miss to occur, which means the requested data word does not exist in the cache memory 44, accessing the data memory 45 is started. The reference numeral 412 denotes an address bus for transferring an address from the cache hit detector 41 to the data memory 45. The reference numeral 413 denotes a data bus for transferring a data word from the data memory 45 to the cache memory 44. Accessing the data memory 45 ordinarily takes a long time. Thus, when a cache miss is determined to occur, an interlock signal 415 is supplied from the cache hit detector 41 to the pipeline control circuit 34. As a result, the pipeline processing of the CPU 3 is suspended. It is noted that a content of the tag memory in the cache hit detector 41 is updated in accordance with the update of a content of the cache memory 44.

Hereinafter, the operation of the microcomputer having the above-described configuration shown in FIG. 1 will be described with reference to FIGS. 2 and 3. Herein, the following two instructions are assumed to be sequentially executed and the data cache 4 is assumed to hit. Instruction 1 is an instruction that a memory data word designated by an address specified by a content of the A0 register should be stored in the D1 register. Instruction 2 is an instruction that operands read out from the D0 and D1 registers should be added and that the data word representing the addition result should be stored in the D1 register.

Instruction 1: MOV (A0), D1
Instruction 2: ADD D0, D1

Figure 2:
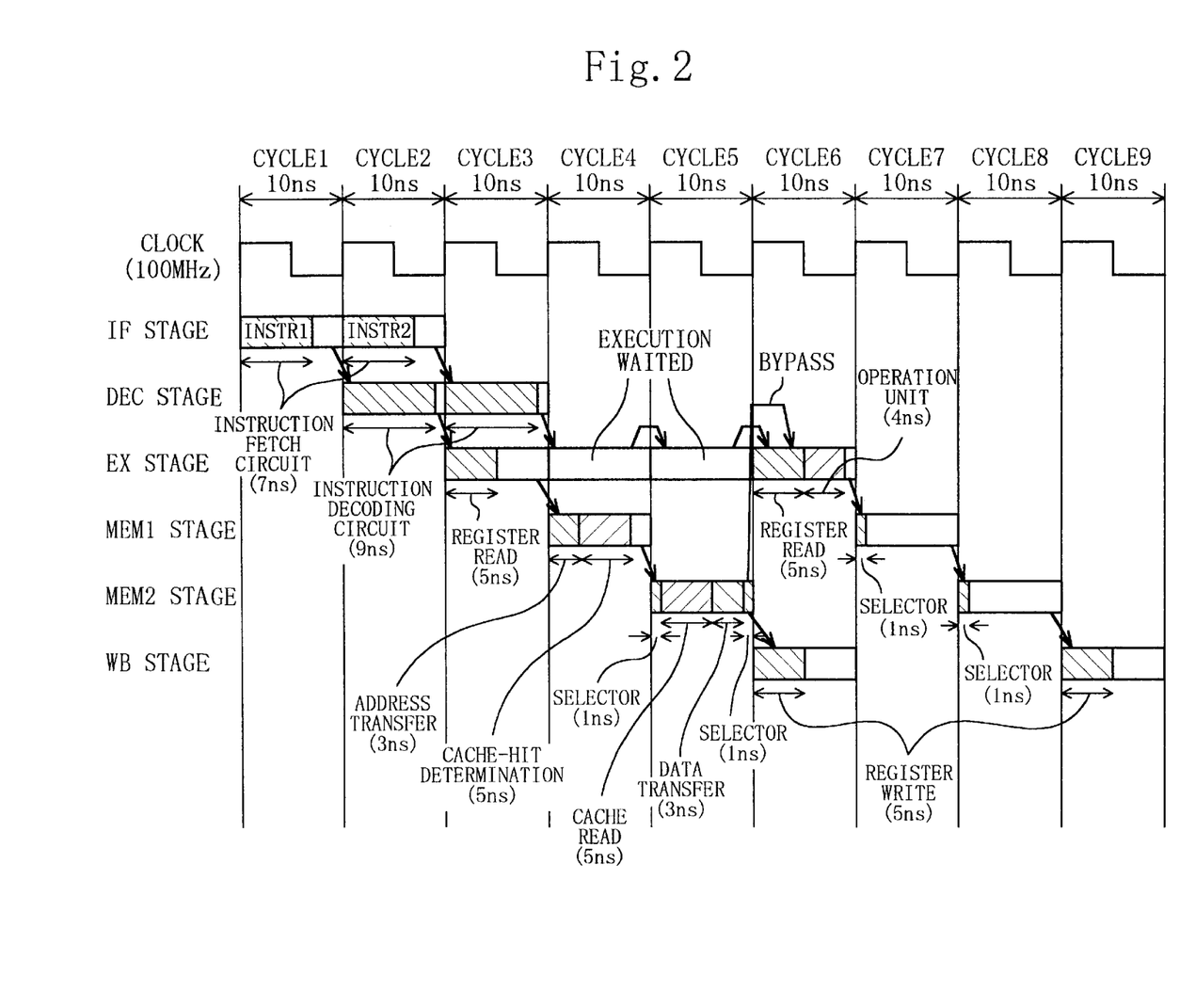
FIG. 2 is a timing diagram illustrating a high-speed mode operation of the microcomputer shown in FIG. 1.

FIG. 2 illustrates the operation of the microcomputer shown in FIG. 1 where the high-speed flag 35 is "1" (indicating the "high-speed mode"). The frequency of the operation clock is 100 MHz. In other words, the length of one machine cycle is 10 ns.

As shown in FIG. 2, in Cycle 1, the instruction fetch circuit 31 fetches Instruction 1 (processing time: 7 ns).

In Cycle 2, the fetched Instruction 1 is decoded by the instruction decoding circuit 32 (processing time: 9 ns). On the other hand, the instruction fetch circuit 31 fetches Instruction 2 (processing time: 7 ns).

In Cycle 3, based on the decoding results of Instruction 1, the content of the A0 register is read out from the register set 331 to the A bus 332a. The content, i.e., the operand address to be used for accessing the data memory 45, is latched in the EX latch 335 by way of the first selector 333 and the operation unit 334 (processing time: 5 ns). On the other hand, the fetched Instruction 2 is decoded by the instruction decoding circuit 32 (processing time: 9 ns).

In Cycle 4, the address latched in the EX latch 335 is transferred through the address bus 411 to the cache hit detector 41 (processing time: 3 ns). The cache hit detector 41 determines that the address causes a cache hit to occur (processing time: 5 ns). Accordingly, the address supplied from the EX latch 335 is latched in the MEM1 latch 42. The total processing time required for this processing associated with Instruction 1 is 8 ns. On the other hand, the execution of Instruction 2 is made to wait in accordance with the control performed by the pipeline control circuit 34.

In Cycle 5, the address selector 43 selects the address latched in the MEM1 latch 42, and as a result, the address is supplied to the cache memory 44 (processing time: 1 ns). In accordance with the address, a data word is read out from the cache memory 44 (processing time: 5 ns). The data word read out from the cache memory 44 is transferred to the third selector 338 through the data bus 414 (processing time: 3 ns). The third selector 338 selects the data word supplied from the cache memory 44 (processing time: 1 ns). As a result, the data word is latched in the MEM2 latch 339. The total processing time required for this processing associated with Instruction 1 is 10 ns. On the other hand, the execution of Instruction 2 is made to wait in accordance with the control performed by the pipeline control circuit 34.

In Cycle 6, the data word latched in the MEM2 latch 339, i.e., the data word requested by Instruction 1, is written into the D1 register in the register set 331 through the C bus 332c (processing time: 5 ns). The execution of Instruction 1 is completed at this point in time. As described above, Instruction 2 is an instruction that the respective operands read out from the D0 and D1 registers should be added. However, at the start point of Cycle 6, the content of the D1 register has not been established yet. Thus, in order to execute Instruction 2, a forwarding path (bypass) running from the MEM2 latch 339 to one input of the operation unit 334 by way of the fourth selector 340 and the first selector 333 is used. On the other hand, the content of the D0 register is read out from the register set 331 to the B bus 332b and supplied to the other input of the operation unit 334 (processing time: 5 ns). The operation unit 334 adds the two inputs (processing time: 4 ns). Then, the EX latch 335 latches the data word representing the addition results. The total processing time required for this processing associated with Instruction 2 is 9 ns.

In Cycle 7, the data word latched in the EX latch 335 is latched in the MEM1 latch 337 by way of the second selector 336 (processing time: 1 ns).

In Cycle 8, the data word latched in the MEM1 latch 337 is latched in the MEM2 latch 339 by way of the third selector 338 (processing time: 1 ns).

In Cycle 9, the data word latched in the MEM2 latch 339, i.e., the data word representing the addition results in accordance with Instruction 2, is written into the D1 register in the register set 331 through the C bus 332c (processing time: 5 ns).

As can be understood, in the high-speed mode, the data cache 4 is controlled so as to supply a data word to the MEM2 stage within two cycles (Cycles 4 and 5) with respect to the input address associated with Instruction 1. This is because address transfer, cache hit/miss determination, cache read, a data word transfer and the like cannot be completed within one machine cycle (10 ns). In response thereto, the instruction execution circuit 33 bypasses the data word, which has been supplied from the data cache 4 to the MEM2 stage, to the EX stage in order to execute Instruction 2. The MEM1 latch 337 in the instruction execution circuit 33 is not used for the execution of Instruction 1.

Figure 3:
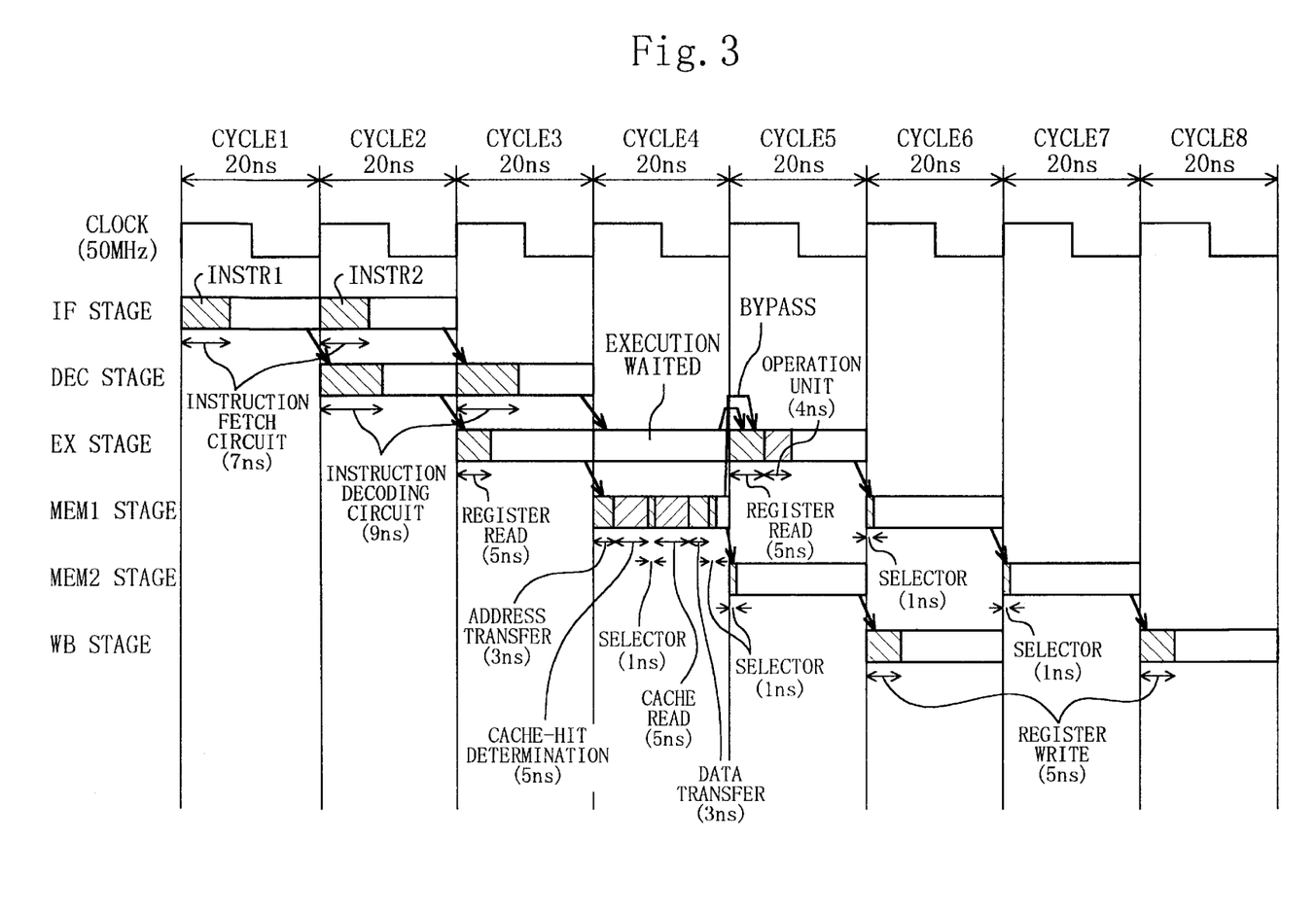
FIG. 3 is a timing diagram illustrating a low-speed mode operation of the microcomputer shown in FIG. 1.

FIG. 3 illustrates the operation of the microcomputer shown in FIG. 1 where the high-speed flag 35 is "0" (indicating the "low-speed mode"). The frequency of the operation clock is 50 MHz. In other words, the length of one machine cycle is 20 ns.

As shown in FIG. 3, in Cycle 1, the instruction fetch circuit 31 fetches Instruction 1 (processing time: 7 ns).

In Cycle 2, the fetched Instruction 1 is decoded by the instruction decoding circuit 32 (processing time: 9 ns). On the other hand, the instruction fetch circuit 31 fetches Instruction 2 (processing time: 7 ns).

In Cycle 3, based on the decoding results of Instruction 1, the content of the A0 register is read out from the register set 331 to the A bus 332a. The content, i.e., the operand address to be used for accessing the data memory 45 is latched in the EX latch 335 by way of the first selector 333 and the operation unit 334 (processing time: 5 ns). On the other hand, the fetched Instruction 2 is decoded by the instruction decoding circuit 32 (processing time: 9 ns).

In Cycle 4, the address latched in the EX latch 335 is transferred through the address bus 411 to the cache hit detector 41 (processing time: 3 ns). The cache hit detector 41 determines that the address causes a cache hit to occur (processing time: 5 ns). Accordingly, the address supplied from the EX latch 335 is not latched in the MEM1 latch 42 but supplied to the cache memory 44 by way of the address selector 43 (processing time: 1 ns). In response to the address, a data word is read out from the cache memory 44 (processing time: 5 ns). The data word read out from the cache memory 44 is transferred to the second selector 336 through the data bus 414 (processing time: 3 ns). The second selector 336 selects the data word supplied from the cache memory 44 (processing time: 1 ns). As a result, the data word is latched in the MEM1 latch 337. The total processing time required for this processing associated with Instruction 1 is 18 ns. On the other hand, the execution of Instruction 2 is made to wait in accordance with the control performed by the pipeline control circuit 34.

In Cycle 5, the data word latched in the MEM1 latch 337, i.e., the data word requested by Instruction 1, is latched in the MEM2 latch 339 by way of the third selector 338 (processing time: 1 ns). As described above, Instruction 2 is an instruction that the respective operands read out from the D0 and D1 registers should be added. However, at the start point of Cycle 5, the content of the D1 register has not been established yet. Thus, in order to execute Instruction 2, a forwarding path (bypass) running from the MEM1 latch 337 to one input of the operation unit 334 by way of the fourth selector 340 and the first selector 333 is used. On the other hand, the content of the D0 register is read out from the register set 331 to the B bus 332b and then supplied to the other input of the operation unit 334 (processing time: 5 ns). The operation unit 334 adds the two inputs (processing time: 4 ns). Then, the EX latch 335 latches the data word representing the addition results. The total processing time required for this processing associated with Instruction 2 is 9 ns.

In Cycle 6, the data word latched in the MEM2 latch 339, i.e., the data word requested by Instruction 1, is written into the D1 register of the register set 331 through the C bus 332c (processing time: 5 ns). The execution of Instruction 1 is completed at this point in time. On the other hand, the data word latched in the EX latch 335, i.e., the data word representing the addition results in accordance with Instruction 2, is latched in the MEM1 latch 337 by way of the second selector 336 (processing time: 1 ns).

In Cycle 7, the data word latched in the MEM1 latch 337 is latched in the MEM2 latch 339 by way of the third selector 338 (processing time: 1 ns).

In Cycle 8, the data word latched in the MEM2 latch 339, i.e., the data word representing the addition results in accordance with Instruction 2, is written into the D1 register in the register set 331 through the C bus 332c (processing time: 5 ns).

As can be understood, in the low-speed mode, the data cache 4 is controlled so as to supply a data word to the MEM1 stage within one cycle (Cycle 4) with respect to the input address associated with Instruction 1. The MEM1 latch 42 in the data cache 4 is not used for the execution of Instruction 1. In response thereto, the instruction execution circuit 33 bypasses the data word, which has been supplied from the data cache 4 to the MEM1 stage, to the EX stage in order to execute Instruction 2. Thus, although the high-speed mode requires nine cycles to complete the execution of Instructions 1 and 2, the low-speed mode requires eight cycles to complete the execution of these Instructions. Assuming the MEM1 latch 42 in the data cache 4 is also used and the same bypass running from the MEM2 stage to the EX stage is still selected in the low-speed mode as in the high-speed mode, it is clear that the performance of the microcomputer decreases.

Figure 4:
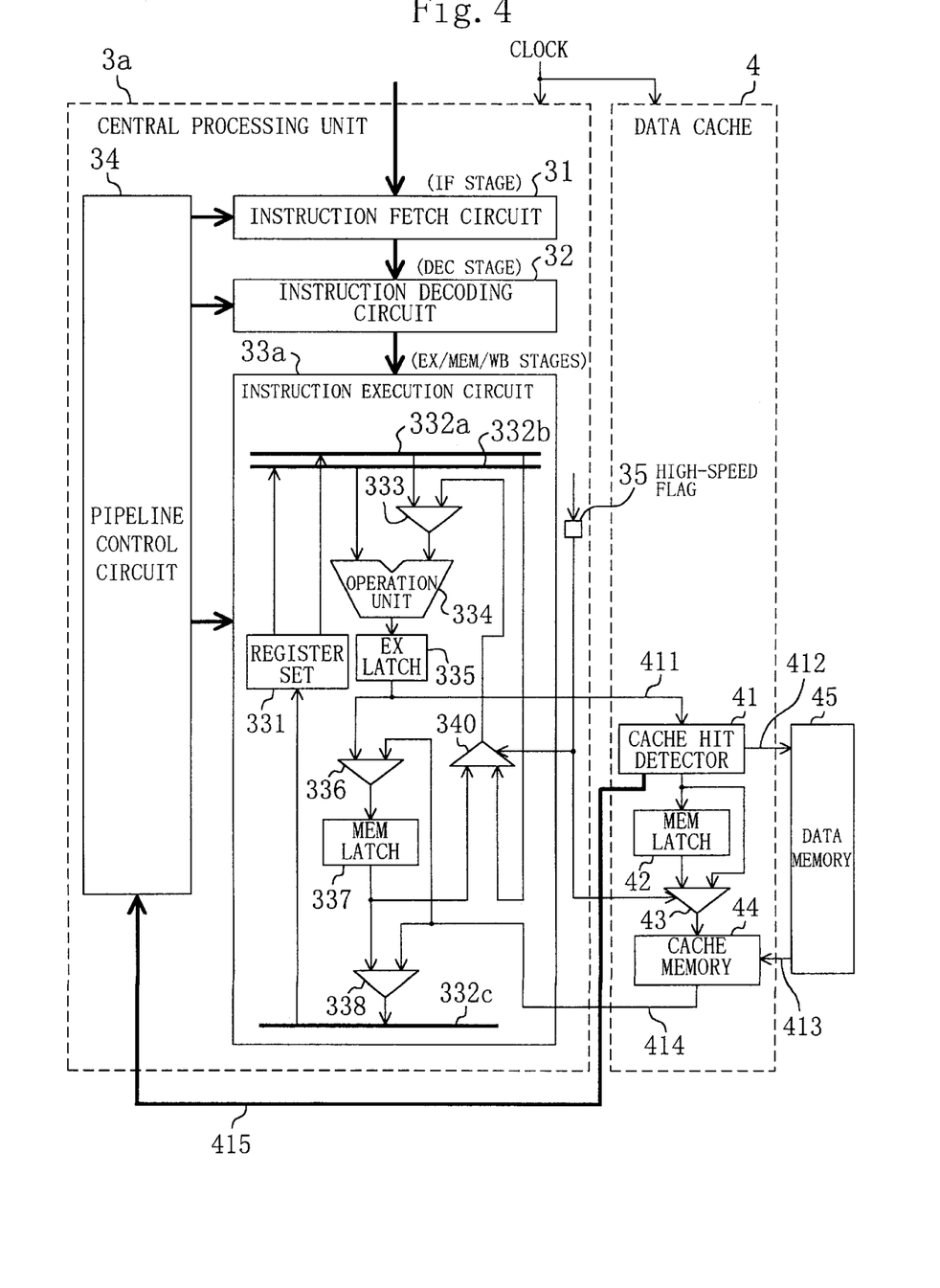
FIG. 4 is a block diagram illustrating another exemplary configuration of the microcomputer according to the present invention.

FIG. 4 illustrates another exemplary configuration of the microcomputer of the present invention. In FIG. 4, a central processing unit (CPU) 3a and a data cache 4 which constitute a core of the microcomputer, and a data memory 45 as an external memory are illustrated. An operation clock having a frequency determined by the user of this microcomputer is supplied to the CPU 3a and the data cache 4.

The CPU 3a includes: an instruction fetch circuit (IF stage) 31 for fetching an instruction from an instruction memory (not shown); an instruction decoding circuit (DEC stage) 32 for decoding the fetched instruction; an instruction execution circuit (EX/MEM/WB stages) 33a for executing the decoded instruction; a pipeline control circuit 34 for controlling the pipeline processing performed by the instruction fetch circuit 31, the instruction decoding circuit 32 and the instruction execution circuit 33a; and a high-speed flag 35 for specifying a high-speed mode in which a clock having a frequency higher than 50 MHz is supplied as the operation clock or a low-speed mode in which a clock having a frequency equal to or lower than 50 MHz is supplied as the operation clock. The value of the high-speed flag 35 is set by the user at "1" for the high-speed mode and at "0" for the low-speed mode.

The instruction execution circuit 33a includes: a register set 331; A, B and C buses 332a, 332b, 332c; a first selector 333; an operation unit 334; an EX latch 335; a second selector 336; an MEM latch 337; a third selector 338; and a fourth selector 340. The register set 331 includes at least an A0 register, a D0 register and a D1 register. The A0 register stores an address. The D0 and D1 registers both store data words. The register set 331 transmits an address/data word to the A bus 332a or to the B bus 332b or receives and stores an address/data word supplied from the C bus 332c. The first selector 333 selects either one of the two inputs, i.e., the address/data word supplied from the A bus 332a and the output of the fourth selector 340. The operation unit 334 performs various operations by using at least one of the operands (addresses/data words) supplied from the B bus 332b and the output of the first selector 333. The EX latch 335 is a pipeline latch for latching the output of the operation unit 334 in synchronism with the operation clock. The second selector 336 selects either one of the two inputs, i.e., the output of the EX latch 335 and the output of the data cache 4. The MEM latch 337 is a pipeline latch for latching the output of the second selector 336 in synchronism with the operation clock. The third selector 338 selects either one of the two inputs, i.e., the output of the MEM latch 337 and the output of the data cache 4. The output of the third selector 338 is supplied to the C bus 332c. If the high-speed flag 35 is "0" (indicating the "low-speed mode"), then the fourth selector 340 selects the first input, i.e., the output of the MEM latch 337. Alternatively, if the high-speed flag 35 is "1" (indicating the "high-speed mode"), then the fourth selector 340 selects the second input, i.e., an operand (address/data word) supplied from the register set 331 to the A bus 332a. The reference numeral 411 denotes an address bus for transferring an address latched in the EX latch 335 to the data cache 4. The reference numeral 414 denotes a data bus for supplying a data word from the data cache 4 to the respective inputs of the second and third selectors 336, 338.

The data cache 4 includes: a cache hit detector 41; an MEM latch 42; an address selector 43; and a cache memory 44. The reference numeral 412 denotes an address bus for transferring an address from the cache hit detector 41 to the data memory 45. The reference numeral 413 denotes a data bus for transferring a data word from the data memory 45 to the cache memory 44. The reference numeral 415 denotes an interlock signal supplied from the cache hit detector 41 to the pipeline control circuit 34 if a cache miss is determined to occur. The configurations of these components are the same as those of FIG. 1. However, in the low-speed mode, the data word supplied from the cache memory 44 is selected by the second selector 336 and latched in the MEM latch 337, while in the high-speed mode, the data word supplied from the cache memory 44 is selected by the third selector 338 and stored in the register set 331.

Hereinafter, the operation of the microcomputer having the above-described configuration shown in FIG. 4 will be described with reference to FIGS. 5 and 6. Herein, the above-described Instructions 1 and 2 are assumed to be sequentially executed and the data cache 4 is assumed to hit.

Figure 5:
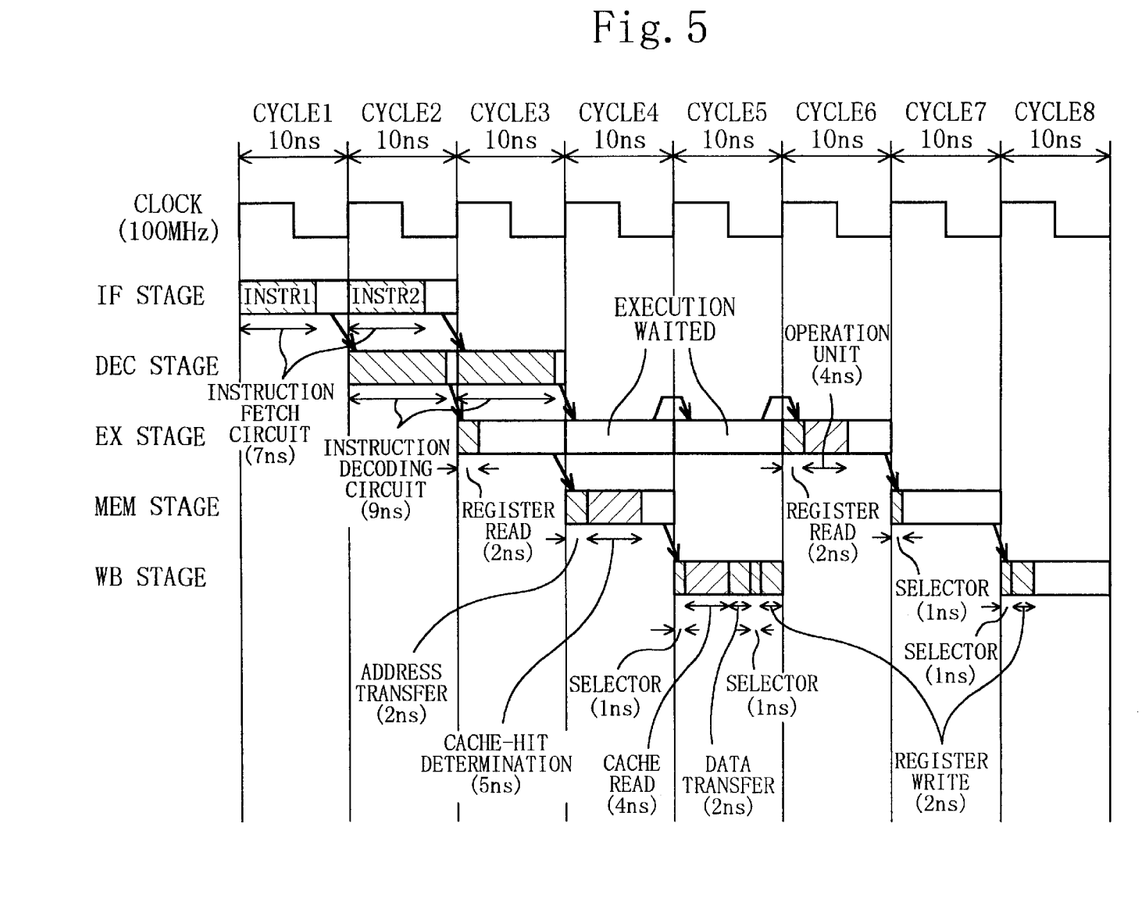
FIG. 5 is a timing diagram illustrating a high-speed mode operation of the microcomputer shown in FIG. 4.

FIG. 5 illustrates the operation of the microcomputer shown in FIG. 4 where the high-speed flag 35 is "1" (indicating the "high-speed mode"). The frequency of the operation clock is 100 MHz. In other words, the length of one machine cycle is 10 ns.

As shown in FIG. 5, in cycle 1, the instruction fetch circuit 31 fetches Instruction 1 (processing time: 7 ns).

In Cycle 2, the fetched Instruction 1 is decoded by the instruction decoding circuit 32 (processing time: 9 ns). On the other hand, the instruction fetch circuit 31 fetches Instruction 2 (processing time: 7 ns).

In Cycle 3, based on the decoding results of Instruction 1, the content of the A0 register is read out from the register set 331 to the A bus 332a. The content, i.e., the operand address to be used for accessing the data memory 45, is latched in the EX latch 335 by way of the first selector 333 and the operation unit 334 (processing time: 2 ns). On the other hand, the fetched Instruction 2 is decoded by the instruction decoding circuit 32 (processing time: 9 ns).

In Cycle 4, the address latched in the EX latch 335 is transferred through the address bus 411 to the cache hit detector 41 (processing time: 2 ns). The cache hit detector 41 determines that the address causes a cache hit to occur (processing time: 5 ns). Accordingly, the address supplied from the EX latch 335 is latched in the MEM latch 42. The total processing time required for this processing associated with Instruction 1 is 7 ns. On the other hand, the execution of Instruction 2 is made to wait in accordance with the control performed by the pipeline control circuit 34.

In Cycle 5, the address selector 43 selects the address latched in the MEM latch 42, and as a result, the address is supplied to the cache memory 44 (processing time: 1 ns). In accordance with the address, a data word is read out from the cache memory 44 (processing time: 4 ns). The data word read out from the cache memory 44 is transferred to the third selector 338 through the data bus 414 (processing time: 2 ns). The third selector 338 selects the data word supplied from the cache memory 44 (processing time: 1 ns). Thus, the data word requested by Instruction 1 is written into the D1 register in the register set 331 through the C bus 332c (processing time: 2 ns). The total processing time required for this processing associated with Instruction 1 is 10 ns. The execution of Instruction 1 is completed at this point in time. On the other hand, the execution of Instruction 2 is made to wait in accordance with the control performed by the pipeline control circuit 34.

At the start point of Cycle 6, the content of the D1 register has already been established. Thus, in Cycle 6, in order to execute Instruction 2, a path running from the register set 331 to one input of the operation unit 334 by way of the A bus 332a, the fourth selector 340 and the first selector 333 is used. The content of the D1 register is supplied to the operation unit 334 through this path. On the other hand, the content of the D0 register is read out from the register set 331 to the B bus 332b and supplied to the other input of the operation unit 334 (processing time: 2 ns). The operation unit 334 adds the two inputs (processing time: 4 ns). Then, the EX latch 335 latches the data word representing the addition results. The total processing time required for this processing associated with Instruction 2 is 6 ns.

In Cycle 7, the data word latched in the EX latch 335 is latched in the MEM latch 337 by way of the second selector 336 (processing time: 1 ns).

In Cycle 8, the data word latched in the MEM latch 337 is selected by the third selector 338 (processing time: 1 ns). The data word selected by the third selector 338, i.e., the data word representing the addition results in accordance with Instruction 2, is written into the D1 register in the register set 331 through the C bus 332c (processing time: 2 ns). The total processing time required for this processing associated with Instruction 2 is 3 ns.

As can be understood, in the high-speed mode, the data cache 4 is controlled so as to supply a data word to the WB stage within two cycles (Cycles 4 and 5) with respect to the input address associated with Instruction 1. This is because address transfer, cache hit/miss determination, cache read, a data word transfer and the like cannot be completed within one machine cycle (10 ns). In response thereto, the instruction execution circuit 33a supplies the data word, which has been supplied from the data cache 4 to the WB stage, to the EX stage in order to execute Instruction 2. The MEM latch 337 in the instruction execution circuit 33a is not used for the execution of Instruction 1.

Figure 6:
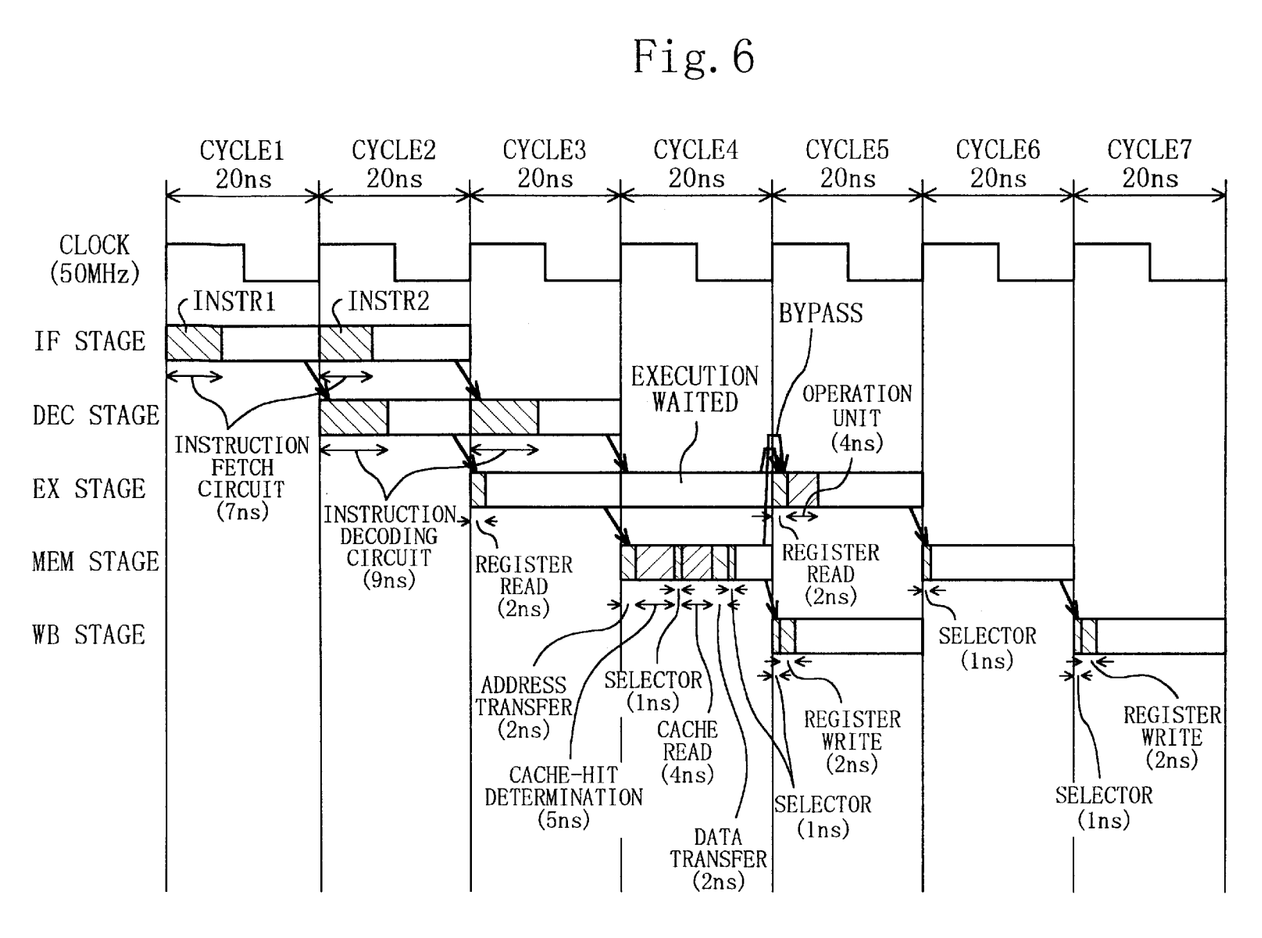
FIG. 6 is a timing diagram illustrating a low-speed mode operation of the microcomputer shown in FIG. 4.

FIG. 6 illustrates the operation of the microcomputer shown in FIG. 4 where the high-speed flag 35 is "0" (indicating the "low-speed mode"). The frequency of the operation clock is 50 MHz. In other words, the length of one machine cycle is 20 ns.

As shown in FIG. 6, in Cycle 1, the instruction fetch circuit 31 fetches Instruction 1 (processing time: 7 ns).

In Cycle 2, the fetched Instruction 1 is decoded by the instruction decoding circuit 32 (processing time: 9 ns). On the other hand, the instruction fetch circuit 31 fetches Instruction 2 (processing time: 7 ns).

In Cycle 3, based on the decoding results of Instruction 1, the content of the A0 register is read out from the register set 331 to the A bus 332a. The content, i.e., the operand address to be used for accessing the data memory 45, is latched in the EX latch 335 by way of the first selector 333 and the operation unit 334 (processing time: 2 ns). On the other hand, the fetched Instruction 2 is decoded by the instruction decoding circuit 32 (processing time: 9 ns).

In Cycle 4, the address latched in the EX latch 335 is transferred through the address bus 411 to the cache hit detector 41 (processing time: 2 ns). The cache hit detector 41 determines that the address causes a cache hit to occur (processing time: 5 ns). Accordingly, the address supplied from the EX latch 335 is not latched in the MEM latch 42 but supplied to the cache memory 44 by way of the address selector 43 (processing time: 1 ns). In response to the address, a data word is read out from the cache memory 44 (processing time: 4 ns). The data word read out from the cache memory 44 is transferred to the second selector 336 through the data bus 414 (processing time: 2 ns). The second selector 336 selects the data word supplied from the cache memory 44 (processing time: 1 ns). As a result, the data word is latched in the MEM latch 337. The total processing time required for this processing associated with Instruction 1 is 15 ns. On the other hand, the execution of Instruction 2 is made to wait in accordance with the control performed by the pipeline control circuit 34.

In Cycle 5, the data word latched in the MEM latch 337 is selected by the third selector 338 (processing time: 1 ns). The data word selected by the third selector 338, i.e., the data word requested by Instruction 1, is written into the D1 register in the register set 331 through the C bus 332c (processing time: 2 ns). The total processing time required for this processing associated with Instruction 1 is 3 ns. The execution of Instruction 1 is completed at this point in time. As described above, Instruction 2 is an instruction that the respective operands read out from the D0 and D1 registers should be added. However, at the start point of Cycle 5, the content of the D1 register has not been established yet. Thus, in order to execute Instruction 2, a forwarding path (bypass) running from the MEM latch 337 to one input of the operation unit 334 by way of the fourth selector 340 and the first selector 333 is used. On the other hand, the content of the D0 register is read out from the register set 331 to the B bus 332b and supplied to the other input of the operation unit 334 (processing time: 2 ns). The operation unit 334 adds the two inputs (processing time: 4 ns). Then, the EX latch 335 latches the data word representing the addition results. The total processing time required for this processing associated with Instruction 2 is 6 ns.

In Cycle 6, the data word latched in the EX latch 335, i.e., the data word representing the addition results in accordance with Instruction 2, is latched in the MEM latch 337 by way of the second selector 336 (processing time: 1 ns).

In Cycle 7, the data word latched in the MEM latch 337 is selected by the third selector 338 (processing time: 1 ns). The data word selected by the third selector 338, i.e., the data word representing the addition results in accordance with Instruction 2, is written into the D1 register in the register set 331 through the C bus 332c (processing time: 2 ns). The total processing time required for this processing associated with Instruction 2 is 3 ns.

As can be understood, in the low-speed mode, the data cache 4 is controlled so as to supply a data word to the MEM stage within one cycle (Cycle 4) with respect to the input address associated with Instruction 1. The MEM latch 42 in the data cache 4 is not used for the execution of Instruction 1. In response thereto, the instruction execution circuit 33a bypasses the data word, which has been supplied from the data cache 4 to the MEM stage, to the EX stage in order to execute Instruction 2. Thus, although the high-speed mode requires eight cycles to complete the execution of Instructions 1 and 2, the low-speed mode requires seven cycles to complete the execution of these Instructions. Assuming the MEM latch 42 in the data cache 4 is also used and the same a data word transfer path running from the WB stage to the EX stage is still selected in the low-speed mode as in the high-speed mode, it is clear that the performance of the microcomputer decreases.

In the example shown in FIG. 1, the microcomputer includes six stages, while in the example shown in FIG. 4, the microcomputer includes five stages. However, the present invention is applicable to a microcomputer having an arbitrary number of pipeline stages.

In each of the foregoing examples, the high-speed flag 35 may be one bit in an internal register in the CPU. Alternatively, a signal specifying either the high-speed mode or the low-speed mode may be directly supplied from out of the microcomputer to the fourth selector 340 and the address selector 43. Also, the selection in the fourth selector 340 and the address selector 43 may be changed in accordance with a power supply voltage supplied to the microcomputer. In such a case, a high-voltage mode corresponds to the high-speed mode and a low-voltage mode corresponds to the low-speed mode.

What is claimed is:

1. A microcomputer for executing a plurality of sequentially given instructions in synchronism with an operation clock, comprising:

a plurality of pipeline stages including a first particular stage, a second particular stage located posterior to the first particular stage and a third particular stage located posterior to the second particular stage;

means for specifying one of a high-speed mode, in which a clock having a higher frequency than a predetermined frequency is supplied to the microcomputer as the operation clock, and a low-speed mode, in which a clock having a lower frequency than the predetermined frequency is supplied to the microcomputer as the operation clock;

a data cache for supplying a data word to the second particular stage within a first number of cycles of the operation clock where the low-speed mode has been specified, and for supplying the data data words to the third particular stage within a second number of cycles of the operation clock where the high-speed mode has been specified, in response to an input address associated with a certain instruction, the second number of cycles being larger than the first number of cycles; and means for supplying the data word, which has been supplied from the data cache to the second particular stage, to the first particular stage where the low-speed mode has been specified, and for supplying the data word, which has been supplied from the data cache to the third particular stage, to the first particular stage where the high-speed mode has been specified, in order to execute a succeeding instruction.

2. The microcomputer of claim 1, wherein the first particular stage is an operation execution stage.

3. The microcomputer of claim 2, wherein the second and the third particular stages are respective sub-stages of a memory access stage.

4. The microcomputer of claim 2, wherein the second and the third particular stages are a memory access stage and a write back stage, respectively.

5. The microcomputer of claim 1, wherein the data cache includes:

a cache memory for supplying a requested data word to one of the second and the third particular stages;

an address latch for latching the input address in synchronism with the operation clock; and means for supplying the input address to the cache memory where the low-speed mode has been specified and for supplying the address latched in the address latch to the cache memory where the high-speed mode has been specified.

6. A microcomputer for executing a plurality of sequentially given instructions in synchronism with an operation clock, comprising:

an instruction fetch circuit for fetching an instruction;

an instruction decoding circuit for decoding the fetched instruction;

an instruction execution circuit for executing the decoded instruction;

a pipeline control circuit for controlling pipeline processing performed by the instruction fetch circuit, the instruction decoding circuit and the instruction execution circuit;

a data cache coupled to the instruction execution circuit; and means for specifying one of a high-speed mode, in which a clock having a higher frequency than a predetermined frequency is supplied to the microcomputer as the operation clock, and a low-speed mode, in which a clock having a lower frequency than the predetermined frequency is supplied to the microcomputer as the operation clock, wherein the data cache includes:

a cache memory for supplying a requested data word to the instruction execution circuit;

an address latch for latching an input address in synchronism with the operation clock; and means for supplying the input address to the cache memory where the low-speed mode has been specified and for supplying the address latched in the address latch to the cache memory where the high-speed mode has been specified, and wherein the instruction execution circuit includes:

a register set;

an operation unit having at least a function of executing operations on operands read out from the register set;

a first pipeline latch having a function of latching a data word representing results of the operations in synchronism with the operation clock and a function of latching a given address associated with a certain instruction in synchronism with the operation clock and supplying the latched address to the data cache as the input address;

a second pipeline latch for latching one of the data word latched in the first pipeline latch and the data word supplied from the cache memory during the low-speed mode in synchronism with the operation clock;

means for writing one of the data word latched in the second pipeline latch and a data word supplied from the cache memory during the high-speed mode into the register set; and means for supplying the data word, which has been supplied from the cache memory and latched in the second pipeline latch, to the operation unit in order to execute a succeeding instruction where the low-speed mode has been specified, and for supplying the data word, which has been supplied from the cache memory and written into the register set, to the operation unit in order to execute a succeeding instruction where the high-speed mode has been specified.

* * * * *